C. F. BEEZLEY, Jr.
INDEXING STOCK PAGE CATALOGUES.
APPLICATION FILED DEC. 26, 1913.

1,127,852.

Patented Feb. 9, 1915.

UNITED STATES PATENT OFFICE.

CHARLES F. BEEZLEY, JR., OF CHICAGO, ILLINOIS.

INDEXING STOCK-PAGE CATALOGUES.

1,127,852. Specification of Letters Patent. Patented Feb. 9, 1915.

Application filed December 26, 1913. Serial No. 808,751.

*To all whom it may concern:*

Be it known that I, CHARLES F. BEEZLEY, Jr., a citizen of the United States, residing at Chicago, in the county of Cook and State of Illinois, have invented certain new and useful Improvements in Indexing Stock-Page Catalogues, of which the following is a specification.

This invention relates to certain improvements in indexing catalogues and particularly in the production of the index for a catalogue made up of stock pages.

In the hardware supply, plumbing supply and many other trades the manufacturers' goods are customarily distributed to the retailers through jobbing houses. The manufacturer's list price from which discounts are made to the jobber, and the jobber's list price from which lesser discounts are made to the retailers, are the same, with the result that an article of manufacture will be listed in the manufacturer's catalogue and also in the catalogues of all the jobbers handling this article at the same price, and any differences in the selling price will reside in the differences in discount made by the manufacturer or the various jobbers from this list price. By reason of this fact it has become expedient and customary to standardize the cataloguing of certain lines of supplies so that a stock page illustrating and listing several articles may be employed in the catalogues of all jobbers handling these articles. These stock catalogue pages are kept standing permanently in type or in electroplates by the catalogue maker and the jobber selects from proofs of these pages those pages which he desires to have incorporated in his catalogue. These selected pages after being arranged in the sequence in which the jobber desires them to appear are numbered consecutively before being printed and an index of all the pages, giving the page or folio number on which each article appears, is then made up. The making of an index for a catalogue of this character, which illustrates in most instances thousands of different articles, has been, prior to my present invention, a long and tedious operation which usually delayed the issuance of the book for some time after all the labor except the printing of the index and the binding of the book had been completed.

The object of my present invention is to reduce the time, labor and expense of making up the index, to eliminate to a large extent the possibility of error in the index and to facilitate the simultaneous indexing of any number of stock page catalogues so that they may all be completed irrespective of each other.

To facilitate an understanding of my invention I have illustrated the same on the accompanying sheet of drawings which should be considered in connection with the following description.

Referring to the drawings, Figure 1 an illustration of a catalogue stock page; Fig. 2 is a fragmentary illustration of a stock index sheet; and Fig. 3 is a fragmentary illustration of a completed catalogue index.

The stock page shown in Fig. 1 and designated by reference character 5 is a typical stock page for a hardware catalogue, and illustrates five different types of hatchets; namely, shingling hatchets, half hatchets, lath hatchets, claw hatchets and broad hatchets, together with the descriptive matter pertaining thereto. This page, together with thousands of others, is kept in stock in type or electroplate by the catalogue manufacturer. From proofs of these pages the hardware jobber selects those pages which he desires to appear in his catalogue. The selected proofs are then arranged in the desired sequence and fastened together to form the dummy.

After the proofs of the selected stock pages are fastened together in the desired sequence the page or folio numbers 6 are applied to the pages consecutively. It is highly improbable that any two jobbers will select all of the same pages for their catalogues or that the pages will be arranged in any two catalogues in the same sequence, consequently, any particular stock page will usually bear a different folio number in each catalogue in which it appears. This fact has heretofore made it impossible to start work on the index until the dummy catalogue had been made up and the pages had received their successive folio numbers. In carrying out my present invention I make up directly from each catalogue stock page kept on hand a stock index sheet, designated generally by reference character 8 (Fig. 2). Each stock index sheet is provided with the names or memoranda relating to the articles illustrated or enumerated on its corresponding stock page, these names or memoranda being arranged in spaced relation on the sheet so as to provide space for the subsequent reception of the folio number that the stock page bears in the catalogue being indexed and also in order that the individual sections, into which the stock sheet is ultimately separated, may be of sufficient size to be readily handled and sorted. On the stock index sheet illustrated, memoranda 9 and 10 have reference to the shingling hatchet on the catalogue stock page. Memoranda 11 and 12 have reference to the half hatchet on the stock page, and so on for the other articles on the page. A number of these stock index sheets for each catalogue stock page are made up at convenient times and filed away for future use. Whenever the stock page 5 is selected by a jobber for incorporation in his catalogue one of the corresponding stock index sheets is removed from the file and as soon as the stock page receives its folio number 6 in the dummy catalogue, this number, as indicated by reference character 13, is applied, preferably in pencil or by a stamp, to the stock sheet 8 in proximity to each name or memorandum appearing thereon.

The stock index sheet is divided into sections by longitudinal and transverse division lines 14, which may be lines of scoring so that the sections can be readily torn apart or may be simply lines of demarcation, along which the sheet may be cut. After the folio number of the stock page has been applied in proximity to each memorandum of the index sheet this sheet is separated along the division lines into a number of individual sections, each bearing one memorandum and the stock page folio number. The sections of all the index sheets employed in the particular catalogue are then assorted and arranged in alphabetical, numerical or other preferred sequence. When the sections have been properly assorted and arranged the complete index of the catalogue may be set up in type directly from the sections. In the finished index the memoranda taken from the index sheet sections will refer to articles appearing or enumerated in the body of the catalogue and the numbers 13 taken from the sections will indicate the folio or number of the page on which the article referred to by the memorandum is illustrated or enumerated.

Reference character 15 (Fig. 3) indicates fragmentary portions of the complete index, the portions shown referring to the stock page illustrated in Fig. 1. It will be observed that each of the articles illustrated on the stock page, shown for purposes of illustration, appears in the index under two headings. For instance, shingling hatchets will be found in the index either under Hatchets or under Shingling, and likewise all the other articles are similarly indexed, with the result that any desired article may be readily found by reference to the index.

It will be manifest that by making up the stock index sheets in quantities and filing them away the greater part of the labor involved in producing the index is completed before the dummy is made up. After the stock pages have received their folio numbers it is only necessary to apply these numbers to the corresponding stock index sheets, separate the sheets into sections and arrange the sections in the desired order. The time required to perform these operations is relatively small in comparison with the time heretofore necessary to index a catalogue of this character. Furthermore, the indexing of any desired number of catalogues may be carried on simultaneously, since each stock page has a number of corresponding stock index sheets, any desired number of which may be removed from the file and divided into sections irrespective of whether the same stock page is being simultaneously incorporated in another catalogue or not.

I claim:

1. The method of indexing stock page catalogues which consists in making up from each catalogue stock page a plurality of stock index sheets, each bearing memoranda relating to the items included in said stock page, selecting from the files of such stock index sheets a sheet corresponding to each stock page to be assembled in a catalogue, designating on each of said selected index sheets adjacent each memorandum the page number of the corresponding stock page in the assembled catalogue, separating said memoranda, and reassembling said memoranda in index relation.

2. The method of indexing stock page catalogues which consists in making up from each catalogue stock page a plurality of stock index sheets, each bearing memoranda relating to the items included in said stock page, selecting from the files of such stock index sheets a sheet corresponding to each stock page to be assembled in a catalogue, designating on each of such selected index sheets adjacent each memorandum the page number of the corresponding stock page in the assembled catalogue, dividing said sheets into sections, each bearing a memorandum and page number, and sorting said sections in index order with respect to the memoranda thereon.

3. The method of indexing stock page catalogues which consists in making up from each catalogue stock page a plurality of stock index sheets, each bearing in spaced relation thereon memoranda relating to the items included in said stock page, selecting from a supply of such stock index sheets a corresponding sheet for each stock page to be assembled in a catalogue, designating on each selected index sheet in proximity to each memorandum thereon the page numbers of the corresponding stock pages in the assembled catalogue, dividing said sheets into sections, each bearing a memorandum and a page number, and arranging said sections in index order with respect to the memoranda thereon.

CHARLES F. BEEZLEY, Jr.

Witnesses:
 IRA J. WILSON,
 FRANKLIN M. WARDEN.